United States Patent [19]

Eichen

[11] Patent Number: 4,876,151

[45] Date of Patent: Oct. 24, 1989

[54] BUILDING MATERIAL AND METHOD OF PRODUCING THE BUILDING MATERIAL

[75] Inventor: Howard R. Eichen, Ventura, Calif.

[73] Assignee: Treestone Corporation, Ventura, Calif.

[21] Appl. No.: 315,543

[22] Filed: Feb. 27, 1989

Related U.S. Application Data

[63] Continuation of Ser. No. 166,966, Mar. 11, 1988, abandoned.

[51] Int. Cl.⁴ .......................... B32B 13/02; B32B 13/04
[52] U.S. Cl. ...................................... 428/446; 162/123; 428/452; 428/454; 428/703; 428/920
[58] Field of Search ................. 162/123; 428/446, 452, 428/454, 703, 920

[56] References Cited

U.S. PATENT DOCUMENTS

| | | | |
|---|---|---|---|
| 4,053,677 | 10/1977 | Corao | 428/703 |
| 4,128,699 | 12/1978 | Kole et al. | 428/703 |
| 4,351,867 | 9/1982 | Mulvey et al. | 428/703 |
| 4,372,814 | 2/1983 | Johnstone et al. | 162/124 |
| 4,378,401 | 3/1983 | Wright | 428/227 |

Primary Examiner—William J. Van Balen
Attorney, Agent, or Firm—Ellsworth R. Roston; Charles H. Schwartz

[57] ABSTRACT

A building material includes a layer of a first cured material and a layer of a second cured material interlocked with the first material. Each cured material includes a mixture of (a) fibers made from a light-weight material (e.g. cellulose), (b) a material (e.g. cement) curable to produce interlinked molecules bound to the fibers and (c) particles of a material (e.g. sand) for tempering the cured material. The weight per unit volume of cellulose in the first material is greater, and the weight per unit volume of cement (or sand) is less, than the respective weights per unit volume of cellulose and cement (or sand) in the first material. The second material may constitute a compressive member when cured. A porous (non-woven) tensile member is adhered to the first layer at the face opposite the second layer to maintain the layers under tension in a particular configuration. A thin layer of a material (e.g. fiberglass strands) providing enhanced strength and resistance to bending and cracking may be adhered to the tensile member. A thin layer of a material (e.g. aluminum) may be adhered to the fiberglass to localize and reflect heat applied to the building material. The tensile member is initially disposed above a surface providing for a drainage, of water through the tensile member. The first and second materials are then individually mixed with an excessive amount of water. The first layer is disposed on the tensile member while wet and the second wet layer is disposed on the first wet layer. Excess water is then drawn from the layers. The fiberglass strands may thereafter by applied to the tensile member and the aluminum may be applied to the fiberglass strands.

51 Claims, 3 Drawing Sheets

BUILDING MATERIAL AND METHOD OF PRODUCING THE BUILDING MATERIAL

This is a continuation of application Ser. No. 166,966, filed 3/11/88, now abandoned.

This invention relates to building materials. More particularly, the invention relates to non-flammable building materials which are relatively light in weight, pleasing in appearance, relatively easily made, easily workable and capable of withstanding the elements. The invention also relates to a method of producing such a building material.

Homes built in any high fire risk area such as forest or resort have problems of catching on fire when adjoining homes start to burn or when trees or other foliage adjacent such houses start to burn. This is particularly true when there is a difficult access to such homes. The adjacent homes have problems of catching on fire because burning cinders from the areas on fire are carried by wind to the roofs of such adjacent homes. These cinders cause the roofs of the adjacent homes to start to burn. The flames then spread from the roofs of such adjacent homes to areas throughout such homes.

Shake roofs are often preferred, particularly in the western United States, because they are attractive in appearance and provide good insulation against the elements. Shake roofs are also considered desirable because they are relatively inexpensive and relatively long lived. However, shake roofs are increasingly being considered undesirable because they are relatively easily flammable.

Various alternatives to shake roofs have been considered and some of these alternatives have actually been tried and used. However, these alternatives have been found lacking for one or more reasons. For example, the alternatives are not considered attractive in appearance or are not considered to be truly non-flammable or are not considered to be impervious to all possible conditions of the elements or are considered to be expensive. Furthermore, these materials are considered to be too heavy for many roof structures. As a result, a truly satisfactory alternative to such roof materials as roof shakes has still not been found even though a considerable effort has been made, and a significant amount of money has been expended, to resolve these problems.

This invention provides a building material which can be used on roofs to retain all of the advantages of roofing materials such as shakes and to eliminate the problems of shake roofs. For example, the roofing material of this invention is pleasing in appearance, particularly since it can be formed to look like shakes. The material is non-flammable, relatively light in weight, able to withstand all conditions of the elements and capable of withstanding large forces without bending or cracking. It can be easily worked. For example, nails can be driven through the material without cracking the material and the material can be easily cut to any desired size or shape as by carbide wood-working tools. The roofing material of this invention can be manufactured relatively inexpensively and applied relatively easily to the roof. It can be manufactured to any desired color and is capable of retaining this color over extended periods of time.

In one embodiment of the invention, a building material includes a layer of a first cured material and a layer of a second cured material interlocked with the first cured material. Each of the cured materials includes a mixture of (a) fibers made from a light-weight material (e.g. cellulose), (b) a material (e.g. cement) curable to produce molecules bound to the fibers and interlinked with one another and (c) particles of a material (e.g. sand) having properties of tempering the cured material. The weight per unit volume of cellulose in the first material is greater, and the weight per unit volume of cement (or sand) is less, than the respective weights per unit volume of cellulose and cement (or sand) in the second material. The second material may constitute a compressive member when cured.

A porous (non-woven) tensile member is adhered to the first layer at the face opposite the second layer to maintain the layers in a particular configuration. Strands of a thin layer of a material (e.g. fiberglass) providing enhanced strength and resistance to bending and cracking may be adhered to the tensile member. A thin layer of a material (e.g. aluminum) may be adhered to the fiberglass to localize and reflect heat applied to the building material.

The tensile member is initially disposed above a surface providing for a drainage of water through the tensile member. The first and second materials are then individually mixed with an excess amount of water. While wet, the first layer is disposed on the tensile member and the second wet layer is disposed on the first wet layer. Excess water is then drained from the layers. The fiberglass strands may thereafter be applied to the tensile member and the aluminum may be applied to the fiberglass strands.

Figure 1:
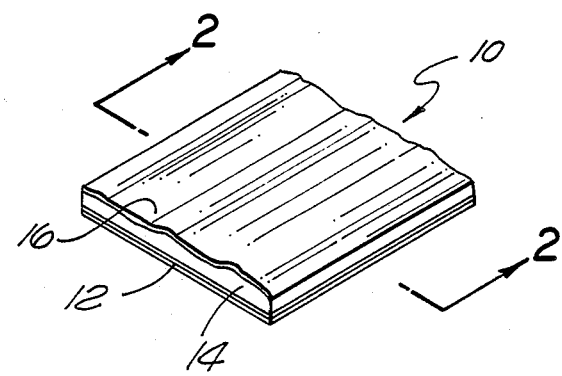
FIG. 1 is a fragmentary perspective view of a roofing material constituting one embodiment of the invention.

In one embodiment of the invention, a building material generally indicated at 10 is preferably provided with a plurality of layers including (a) a tensile member 12, (b) a first layer 14 of a cured material disposed on the member 12 in mechanically interlocked relationship with the member 12 and (c) a second layer 16 disposed on the layer 14 in mechanically and chemically interlocked relationship with the layer 14. A thin layer 18 of a material may be disposed on the member 12 to impart strength to the building material and to inhibit the building material from cracking or bending. A thin layer 20 of a material having properties of reflecting and localizing heat applied to the building material may be adhered to the layer 18.

The tensile member 12 is made from a thin layer of a strong material which acts to maintain the layers 14 and 16 in a particular configuration after the materials forming the layers have been cured. The tensile member 12 is preferably formed in a woven or non woven fabric to allow water in the layers 14 and 16 to drain or be drawn, and preferably drawn, from the materials constituting such layers while such materials are curing. For example, the tensile member 12 may be formed from nylon having fibers interlocked on a random basis. Nylon is desirable because it receives the material of the layer 14 in its pores and mechanically interlocks such material in the pores.

The layer 14 includes fibers 24 made from a lightweight material such as cellulose. Preferably the fibers have a length to approximately one (1) centimeter but any size of fibers can probably be used. Fibers with a length in the range of approximately one millimeter (1 mm) to approximately five millimeters (5 mm) are preferred. Preferably the cellulose is obtained from recycled paper such as office-grade paper or from cardboard. However, other types of cellulose such as wood chips can be used.

The fibers 24 are preferably formed from a material which is not attacked by an alkali such as exists in cement such as portland cement. For example, certain types of plastics can be used as the fibers 24. Asbestos fibers can also be used, particularly since the fibers are locked in position in the layer 14 of the cured material so that the fibers cannot escape from such material.

The layer 14 also includes a material 26 having properties of becoming cured with age to produce molecules bound to the fibers 24 and interlocked with one another. Preferably the curable material 26 is a cement such as a portland cement. Portland cement is desirable because it is resistant to fire, is strong and wears well in all atmospheric conditions. However, other material including some polymers can be provided with substantially the same properties as those discussed above. These materials can be used can be included to replace at least some of the cement.

The layer 14 further includes a material 28 having properties of tempering (or strengthening) the curable material 26. Preferably particles of sand are used as the material 28 when the curable material 26 is a cement such as portland cement. However, other materials can be used satisfactorily with the curable material 26 such as portland cement. For example, fine particles of a rock aggregate, calcium carbonate (limestone sand) or sodium silicate can also be used with, or in place of, sand. When such materials as polymers are used as the curable material 26, other tempering materials 28 than sand can be used.

When a mixture of portland cement, sand and cellulose fibers are mixed with an excess of water and water is drawn or drained, preferably drawn, from the mixture, the cement 26 initially forms dendrites with the fibers 24. The dendrites then continue to grow and interlock with one another as the water continues to be drawn from the wet mixture. The formation and subsequent interlocking of the dendrites causes the cured material to be strong and to resist cracking even when subjected to relatively large forces. The dendrites also interlock with the sand particles 28, thereby enhancing the strength of the strength of the cured material and the resistance of the material to cracking.

As will be appreciated, the cellulose fibers 24 in the layer 14 are considerably lighter than the cement 26. The inclusion of the cellulose fibers 24 in the layer 14 accordingly tends to decrease considerably the weight of the layer. The layer 14 is not flammable even with the inclusion of the cellulose fibers 24 in the layer because the cellulose fibers are substantially uniformly dispersed in the cement mixture in the layer, are locked in position in the layer and are not exposed.

Particles of a coloring material 30 may be included in the layers 14 and 16. Different types of coloring materials 30 may be used. For example, the coloring material 30 may be an iron oxide or carbon. Iron oxide can now be obtained in a wide variety of colors so a mixture of iron oxides can provide substantially any hue desired. Preferably the color of the layer 14 is made substantially the same as the color of the layer 16.

The different materials can be mixed in relatively wide ranges of percentages by weight to obtain the layer 14. For example, the different materials can have the following ranges by weight:

| Material in Layer 14 | Relative Percentages by Weight |
| --- | --- |
| Sand particles | To approximately thirty percent (30%) |
| Cellulose fibers | Approximately three percent (3%) - Approximately thirty percent (30%) |
| Portland cement | Balance of material to give a total of one hundred percent (100%) |
| Coloring material | To approximately three percent (3%) |

It is desirable that the amount of the portland cement in the layer 14 be at least fifty percent by weight and preferably at least sixty percent (60%) by weight. Preferably the different materials have the following percentages by weight:

| Material in Layer 14 | Relative Percentages by Weight |
| --- | --- |
| Sand particles | Approximately twenty percent (20%) |
| Cellulose fibers | Approximately twenty percent (20%) |
| Coloring material | To approximately three percent (3%) |
| Coloring material | Approximately one and one quarter percent (1¼%) |
| Portland cement | Balance of material to give a total of one hundred percent (100%) |

The layer 16 preferably employs the same materials in the cured mixture as the layer 14. However, the layer 16 has more cement, and less cellulose fibers, per unit volume than the layer 14. For example, the layer 16 may have the following ranges of materials by weight:

| Material in Layer 16 | Relative Percentage by Weight |
| --- | --- |
| Cellulose fibers | Approximately three percent |

-continued

| Material in Layer 16 | Relative Percentage by Weight |
|---|---|
| Cement | (3%) - Approximately fifteen percent (15%) Approximately fifty percent (50%) - Approximately seventy five percent (75%) |
| Sand | Remainder by weight |
| Coloring material | To approximately six percent (3%) |

The layer 16 preferably has the following relative amounts of materials by weight:

| Material in Layer 16 | Relative Percentage by Weight |
|---|---|
| Cellulose fibers | Approximately five percent (5%) |
| Sand | Approximately thirty five percent (35%) |
| Cement | Approximately fifty four percent (54%) |
| Coloring material | Approximately six percent (6%) |

Preferably the layer 14 is considerably thicker than the layer 16. For example, the layer 14 may have a thickness of approximately one quarter inch (¼") to one inch (1") and the layer 16 may have a thickness of approximately one sixteenth inch (1/16"). However, the layer 16 may be even thinner than one sixteenth of an inch (1/16"). Furthermore, the layer 16 may cover only the butt or thick end (the "weather" end of the shake) of the adjacent face of the layer 14 without covering the fringe of the layer 14.

Since the layer 16 has more cement (or sand) per unit volume and less cellulose fiber per unit volume than the layer 14, it is harder and tougher than the layer 14. The layer 16 may accordingly be considered to constitute a protective sheath since it is the layer which is exposed to the atmosphere. Furthermore, the layer 16 constitutes a compressive member which acts in conjunction with the tensile layer 12 in providing considerable strength and toughness to the material 10 after the layers 14 and 16 have cured.

The combination of the layers 14 and 16 offers certain other important advantages. For example, the combination is relatively light in weight. The lightness in weight results from the inclusion of a considerable volume of cellulose fibers in each of the layers 14 and 16. The cellulose fibers have a weight per cubic unit area at least five (5) times less than the weight of cement per cubic unit area. As a result, in the preferred embodiment of the layer 14, the volume of the cellulose fibers approaches twice that of the cement. Similarly, in the preferred embodiment of the layer 16, the volume of the cellulose fibers may approach one third (⅓) that of the cement.

The combination of the layers 14 and 16 is also strong. This results in part from the tensile force provided by the member 12 and the compression provided by the layer 16 after the layers 14 and 16 have cured. This may be seen from the fact that opposite ends of a slab of the building material 10 (comprising only the member 12 and the layers 14 and 16) may be supported so that the middle portion of the slab is unsupported. A person is then able to stand on the middle portion of the slab without cracking or breaking the slab when the slab has an unsupported of approximately five inches (5"). This is the length generally spanned over the openings between spaced sheathing on shake roofs.

The combination of the layers 14 and 16 also has other important advantages. For example, the combination is workable. For example, nails may be driven cleanly and relatively easily through the combination of the layers 14 and 16 to produce a hole having only the dimensions of the body of the nail. Furthermore, no cracks emanate from this hole. The material may also be easily cut as by carbide wood working tools. This is important in attaching pieces of the building material 10 to supports on a roof.

When it is desired to form the combination of the tensile member 12 and the layers 14 and 16 of the cured material, the tensile member 12 may be disposed on a level bed of sand 50 preferably having properties of passing water through the sand at a high rate. Preferably this sand is at least three quarters of an inch (¾") thick to insure that water will continue to be drawn through the sand for an extended period of time without a saturation of the sand by the water. Such a bed of sand 50 is desirable since it tends to draw excess water relatively rapidly from the layers 14 and 16. This is particularly true when water can drain below the sand as through gravel. This is desirable in providing the material 10 with the properties discussed above. As will be appreciated, the sand 50 can constitute soil. Preferably the soil 50 is dry so that it will be able to draw or drain water.

The materials for each of the layers 14 and 16 are then thoroughly and separately mixed with an excess amount of water. For example, water may be added so that as much as approximately eighty percent (80%) in each of the mixtures may constitute water by weight. The tensile member 12 may then be disposed on the sand 50 as in FIG. 3 so that the sand can dewater the excess water from the layers 14 and 16 as by drawing or draining the water. It will be appreciated that other methods than the disposition of the tensile material 12 on the sand 50 can be used to dewater excess water from the layers 14 and 16 as by drawing or draining.

Figure 3:
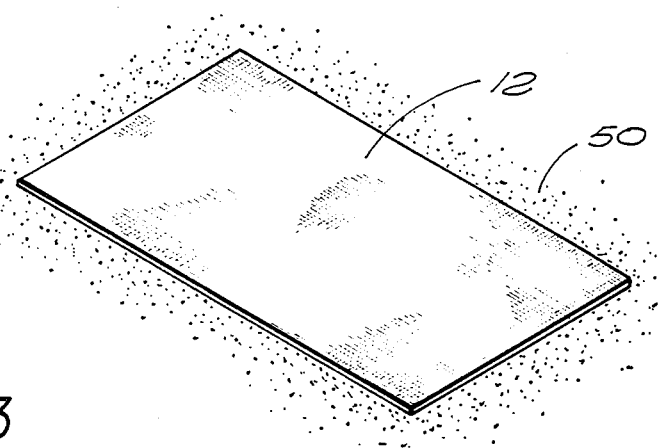
FIG. 3 is a schematic perspective view illustrating a first step, involving the use of a tensile member, in a method of forming the roofing material shown in the previous Figures.
Figure 4:
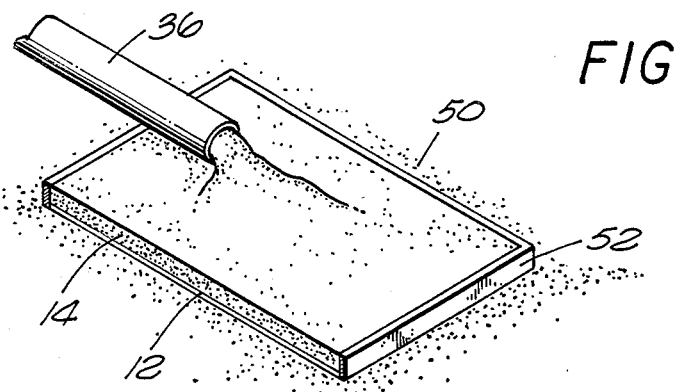
FIG. 4 is a schematic perspective view, similar to that shown in FIG. 3, illustrating a second step in a method of forming the roofing material shown in the previous Figures.
Figure 5:
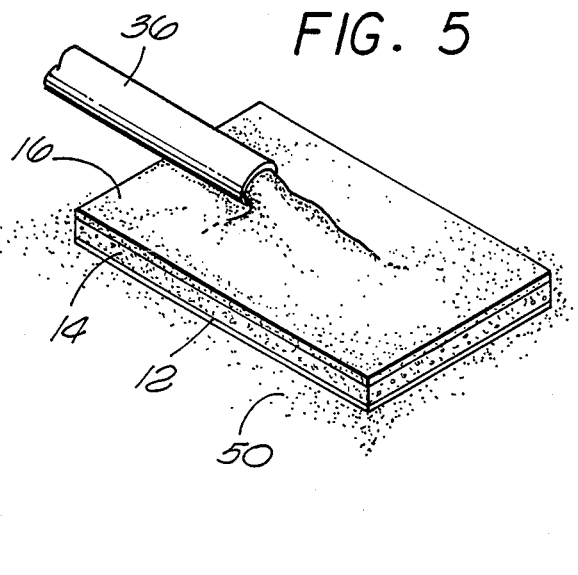
FIG. 5 is a schematic perspective view, similar to that shown in FIGS. 3 and 4, illustrating a third step in the method of forming the roofing material shown in the previous Figures.

Forms 52 can then be disposed on the tensile member 12 as in FIG. 3. The forms 52 preferably have a total length of several feet. The layer 14 is then disposed, preferably in a particular shape, on the tensile member 12 within the forms 52 (as shown in FIG. 3). The layer 14 preferably fills the forms 52 to the top of the forms. The forms 52 are then preferably removed. The layer 16 is thereafter disposed on the layer 14 in the particular shape or in any other desired shape while the layer 14 is still wet. This is indicated in FIG. 5. Preferably the layer 16 is disposed on the layer 14 only a few minutes after the layer 14 has been provided in the forms 52. The material may thereafter be cut into the desired shapes after the material has been embassed and then cured for some time.

The water in the layers 14 and 16 is thereafter drained or drawn, preferably drawn, into the sand 50 below the tensile member 12 to dewater the layers. As the layers 14 and 16 become dewatered, dendrites are formed between the cellulose fibers and the cement. The dendrites also interlock with one another and with the sand particles during the curing of the material so to provide the building material 10 with strong properties.

As the dendrites are formed by the cement curing on the cellulose fibers, the cement actually tends to infiltrate into the fibers. This has certain advantages. It tends to isolate the cellulose fibers, thereby insuring that the building material 10 will be non-flammable. It also tends to strengthen the building material by enhancing the formation of the dendrites. It also tends to prevent voids from being created in the building material 10. After the excess water has been drawn from the layers 14 and 16, the layer 16 is preferably maintained wet to insure that the cement will be cured properly to impart optimal strength to the material 10.

Figure 6:
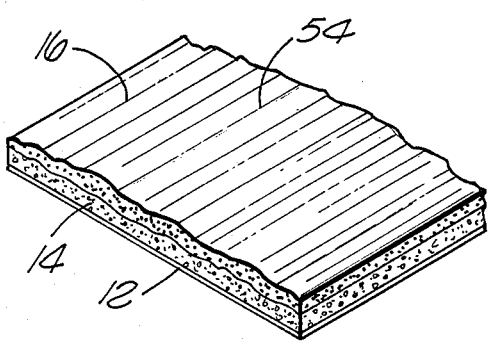
FIG. 6 is a schematic perspective view, similar to that shown in FIGS. 3-5, of the roofing material after the steps schematically illustrated in FIGS. 3-5 and after the top layer of the material has been embossed to provide the material with the appearance of shake.

After about one and one half (1½) to three (3) hours, the top surface of the layer 16 is embossed as at 54 to provide the material 10 with the appearance of shake roofing. This is shown in FIG. 6. The amount of time is dependent upon weather conditions and the moisture of the underlying sand 50. A first stage curing then takes for a period of approximately one and one half (1½) to three (3) days. The amount of time for this curing is dependent upon weather conditions. The material 10 is then cut into segments having widths of approximately fifteen inches (15"). The segments are then preferably stacked tightly for a period of approximately seven (7) to ten (10) days to provide a second stage curing. In the summertime, the segments may have to be wrapped in a plastic material to slow the second stage curing.

Since the building material 10 is preferably in the open atmosphere while it is being cured in the first and second stages, it may sometimes rain during the curing process. Such rainfall if it is not too soon slows, but aids, the curing process since it allows additional dendrites to be formed. This is particularly true if the rainfall does not occur too soon after the curing has started. The strength of the building material 10 will accordingly become enhanced.

After the second stage curing, the segments are cut to various widths to simulate shakes. Furthermore, after the second stage curing, the segments of the pieces cut from the segments may have to be dipped in a polymer/coloring material to enhance and regulate their color and to improve the adherance of the tensile member.

Figure 2:
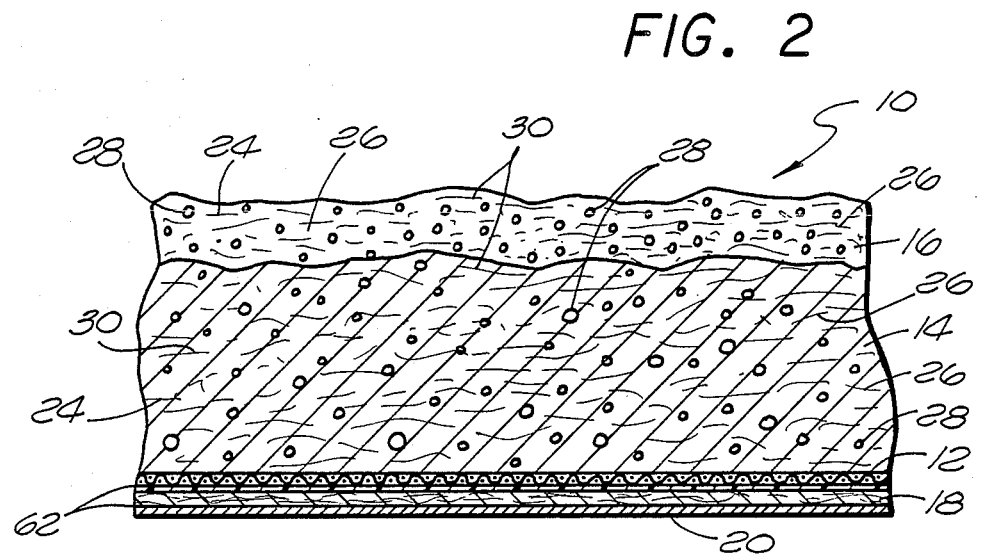
FIG. 2 is an enlarged fragmentary sectional view of the roofing material shown in FIG. 1 and is taken substantially on the line 2—2 of FIG. 1.

The building material including the tensile member 12 and the layers 14 and 16 is shown in FIGS. 1, 2 and 6. The strands of the material 18 may be adhered to the tensile member 12 as by a suitable material 62 to enhance the strength of the building material and the resistance of the building material to bending and breaking when subjected to high forces. For example, such forces may result from a high wind which travels upwardly along the roof. Such wind forces are in a direction to tend to lift the building material from the roof and break the building material.

Figure 7:
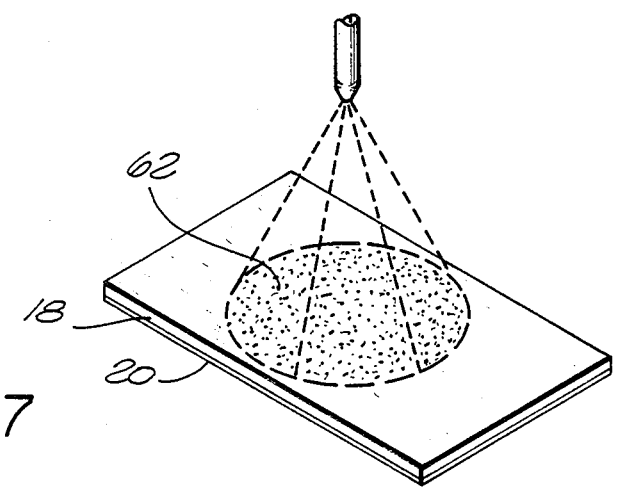
FIG. 7 is a schematic perspective view illustrating a method of applying an adhesive material to the bottom of the roofing material shown in FIGS. 6 and 7 or to the tensile member shown in FIG. 3.
Figure 8:
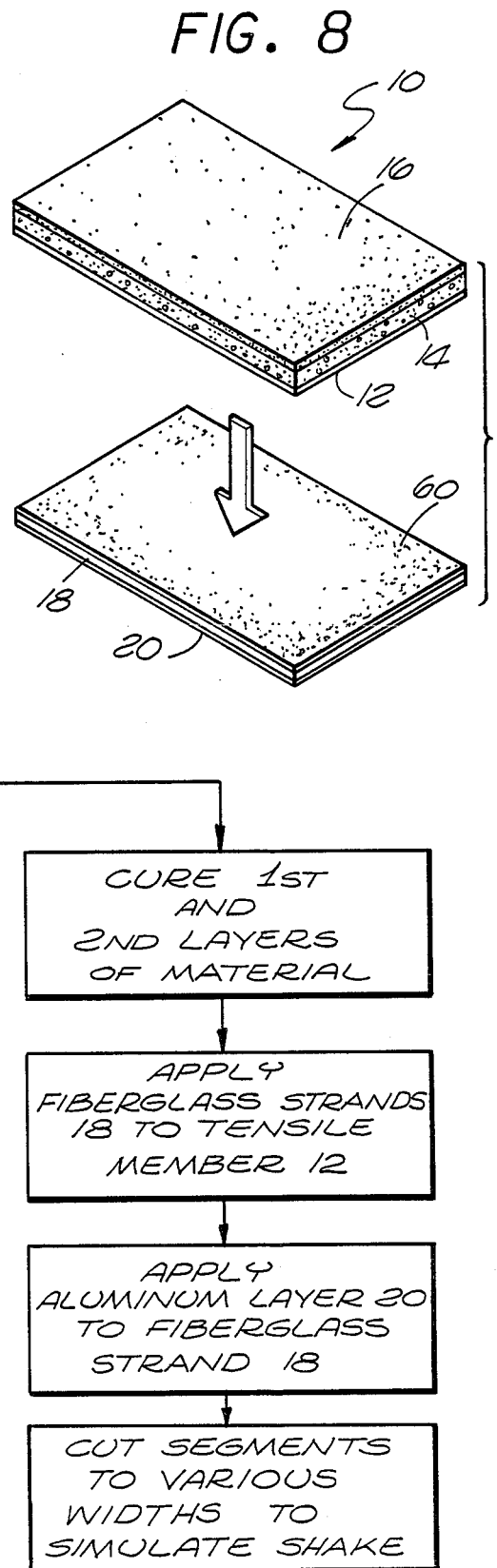
FIG. 8 shows how additional layers are applied to the coating material shown in FIG. 7 as by attachment to the adhesive shown in FIG. 8.
Figure 9:
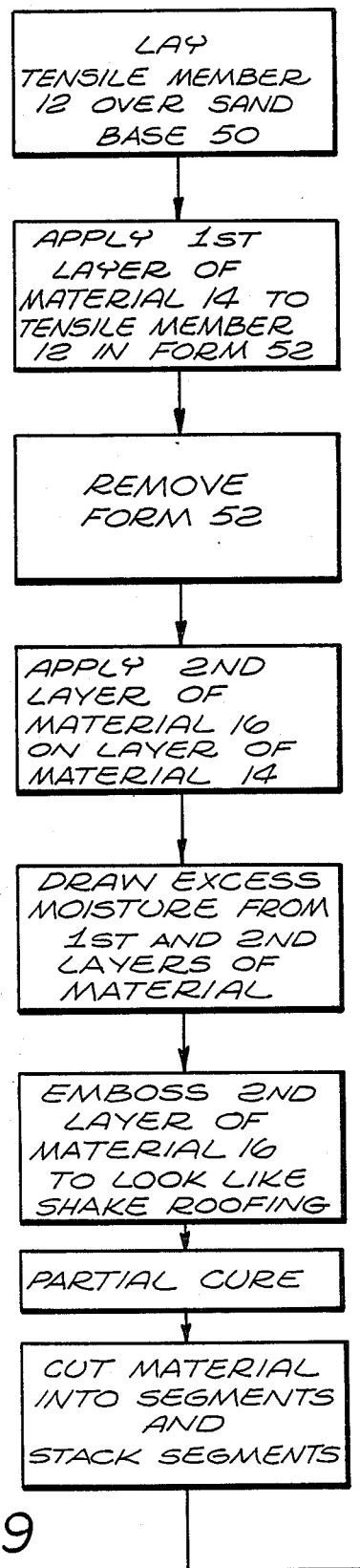
FIG. 9 is a flow chart specifying the different steps in the method of forming the roofing material shown in FIGS. 1 and 8.

Preferably the layer 18 is formed from fibers of strands extending in the longitudinal direction. When the building material 10 is used as a shake on a roof, the fibers or strands extend upwardly toward the top of the roof. Fiberglass is preferably used as the material for the layer 18 although other materials may be used satisfactorily. When fiberglass is used as the material for the layer 18, it may be purchased from the Owens-Corning Corporation as E-Glass Roving. The strands 18 may be attached to the tensile member 12 by a suitable adherent such as a latex as indicated at 62 in FIG. 7. The layer 18 may thereafter be adhered to the tensile member 12 as indicated in FIG. 8. It will be appreciated that the latex 62 may be applied at spaced positions across to the tensile member 12 rather than continuously along the tensile member.

A thin layer of the material 20 may be suitably attached to the layer 18 to localize and reflect heat applied to the building material 10 such as from an adjacent fire or from the sun. Since the layer 20 reflects heat, it provides an excellent insulator against the passage of heat into or from the building through the roof when the material 10 is disposed on the roof of the building. The thin layer 20 may be formed from a suitable material such as aluminum. However, other suitable materials may also be used for the layer 20. The layer 20 may be provided with a suitable thickness such as in the order of ten thousandths of an inch three thousandths of an inch (0.003"). A material such as aluminum is desirable because it reflects heat but does not emit heat. It accordingly constitutes a good heat barrier in preventing heat as from flames from passing into the house through the roof.

It will be appreciated that a satisfactory embodiment of the invention may comprise only the tensile member 12 and the layers 14 and 16. For example, such a material may be satisfactory for most roofs. The layers 18 and 20 may be included when it is desired, as in a Class A material, to insure that heat will not be transmitted through the roof to the interior of a building as in a fire.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

I claim:

1. In combination in a building material,
a first layer including a cured mixture of cellulose fibers, sand and cement, each of the cellulose fibers and the sand constituting approximately twenty percent (20%) by weight in the cured mixture and the cement constituting the remainder of the mixture, and
a second layer integral with the first layer and including a cured mixture of sand, cellulose fibers and cement, the sane constituting approximately thirty five percent (35%) by weight in the mixture and the cellulose fibers constituting approximately five percent (5%) by weight in the mixture and the cement constituting the remainder of the mixture.

2. In a combination as set forth in claim 1,
the first layer being thicker than the second layer.

3. In a combination as set forth in claim 2,
a porous tensile member mechanically interlocked with the first layer at the opposite face of the first layer from the second layer.

4. In combination in a building material,
a first layer including a cured mixture of a cement, a sand and fibers of a material having properties of absorbing the cement before the curing of the cement, the cement having a range in the mixture of at least fifty percent (50%) by weight the fibers having a range in the mixture of approximately three percent (3%) to thirty percent (30%) by weight and the remainder in the mixture constituting the sand, and
a second layer integral with the first layer and including a cured mixture of cement, sand and fibers of a material having properties of forming dendrites with the cement during the curing of the cement, the cement having a range in the mixture of approximately fifty percent (50%) to seventy five percent (75%) by weight and the fibers having a range in the mixture of approximately three percent (3%) to fifteen percent (15%) by weight and the remainder in the mixture constituting sand.

5. In a combination as set forth in claim 4,
the cement constituting portland cement and the second layer being thinner than the first layer.

6. In a combination as set forth in claim 5,
a porous tensile member mechanically interlocked the first layer at the face of the first layer opposite the second layer.

7. In a combination as set forth in claim 6,
a layer of a fibrous material adhered to the tensile member to enhance the strength of the combination.

8. In a combination as set forth in claim 7,
a thin layer of a reflective metal adhered to the layer of the fibrous material.

9. In combination in a building material,
means providing protection against the elements including rain and fire, the protection means including a cured mixture of cellulose fibers, sand and cement, the cement constituting at least fifty percent (50%) by weight of the mixture, the cellulose fibers constituting to approximately twenty five percent (25%) of the mixture by weight and the remainder constituting sand, and
a porous member adhered to the protection means and having properties of supporting the protective means during the curing of the protective means and providing a tensile relationship with the protective means after the curing of the protective means to maintain the protective means in a particular shape.

10. In a combination as set forth in claim 9,
a thin layer of a non-flammable fibrous material adhered to the porous member, the fibrous material having strong and resilient properties and including a plurality of fibers disposed in a particular direction.

11. In a combination as set forth in claim 10,
a thin sheet of a non-flammable material adhered to the layer of the fibrous material, such non-flammable material having properties of reflecting heat.

12. In a combination as set forth in claim 9,
the protection means constituting first and second layers adhered to each other, the first layer being adhered to the porous member and to the second layer, the first layer having a greater percentage of cellulose fibers per unit volume by weight, and a smaller percentage of concrete per unit volume by weight, than the second layer.

13. In a combination as set forth in claim 12,
the second layer being exposed to the atmosphere, the cellulose fibers having a length in the range of approximately one millimeter (1 mm) to approximately five millimeters (5 mm).

14. In combination in a building material,
a first cured mixture including fibers made from a light-weight material, a material having properties of being cured with age to produce molecules bound to the fibers and interlinked with one another and particles of a material having properties of tempering the cured material,
a second cured mixture disposed in adhered relationship with the first cured mixture, the second cured mixture including fibers made from the light-weight material, a material having properties of being cured with age to produce molecules bound to the fibers and interlinked with one another and particles of a material having properties of tempering the cured material,
the weight per unit volume of the fibers in the first cured mixture being greater than the weight per unit volume of the fibers in the second cured mixture and the weight per unit volume of the cured material in the first mixture being lesser than the weight per unit volume of the cured material in the second mixture, and
a porous tensile member adhered in a thin layer to the first cured mixture at the face of the first cured mixture opposite the second cured mixture.

15. In a combination as set forth in claim 14,
the amount of the fibers by weight in the first cured mixture constituting to approximately twenty percent (20%) by weight and the weight per unit volume of the particles of the tempering material in the first cured mixture constituting to approximately twenty percent (20%) by weight and the weight per unit volume of the cement constituting at least fifty percent (50%) by weight and
the weight per unit volume of the fibers in the second cured mixture constituting to approximately five percent (5%) by weight and the weight per unit volume of the cured material in the second cured mixture constituting between approximately thirty five percent (35%) and seventy five percent (75%) by weight, the second cured mixture being able to withstand bending.

16. In a combination as set forth in claim 14,
means adhered to the tensile member for localizing and reflecting the heat applied to the building material.

17. In a combination as set forth in claim 15 for application to a building,
means adhered to the tensile member for imparting strength to the first and second cured mixtures to prevent such cured mixtures from cracking as a result of forces applied to such cured mixtures to lift such cured mixtures from the building, and
means adhered to the strengthening means to reflect the heat applied to the first and second cured mixtures.

18. In a combination as set forth in claim 14,
the fibers constituting cellulose fibers and the cured material constituting cement.

19. In combination in a building material,
means disposed in a cured state and having non-flammable properties and including a mixture of a light-weight material disposed in the form of fibers, a material having properties of being cured with age to produce molecules bound to the fibers and interlinked with one another and particles of a material having properties of tempering the cured material,
a porous tensile member adhered in a thin layer to the cured means to tension the cured means for maintaining the cured means in a particular configuration, and
non-flammable means adhered to the porous tensile member to provide a reflection and localization of heat applied to the cured means.

20. In a combination as set forth in claim 19,
the non-flammable means including first means adhered to the porous tensile member and providing strands of a material having strong and resilient properties to withstand forces on the cured means for bending or cracking the cured means and further including second means adhered to the first means in a thin layer and having properties of localizing and reflecting heat applied to the cured means.

21. In a combination as set forth in claim 20,
the fibers having a length to approximately one millimeter (1 mm) to five millimeters (5 mm) and having properties of absorbing the cured means.

22. In a combination as set forth in claim 20,
the curable material having properties of being cured when subjected to water and when the water is thereafter drawn from the curable material.

23. A method of producing a building material, including the steps of:
providing a mixture of cellulose fibers, sand and cement in dry form,
mixing an excess of water in the mixture,
disposing the wet mixture on a strong porous tensile member to retain the wet mixture in a particular shape on the porous tensile member, and
providing for a dewatering of any excess water from the wet mixture through the porous tensile member.

24. A method as set forth in claim 23, including
the step of adhering a thin layer on the porous tensile member of a material in the form of strands after any excess water has been dewatered from the wet mixture and curing has been completed, the material having properties of imparting strength to the building material and of preventing the building material from bending or cracking when subjected to forces for lifting the building material from a building to which the building material is applied.

25. A method as set forth in claim 24, including the step of
adhering to the thin layer of fiber material a thin layer of a material having properties of reflecting and localizing heat applied to the building material.

26. A method as set forth in claim 25 wherein
the cellulose fibers have a dry weight in the mixture to approximately twenty percent (20%) by weight and the cement has a dry weight in the mixture of approximately fifty eight percent (58%) by weight and sand constitutes the remainder by weight.

27. A method as set forth in claim 23 wherein
the porous element is disposed on a dry and sandy soil and the wet mixture is applied on the porous element and the water is drawn from the mixture during the curing of the mixture.

28. A method of producing a building material, including the steps of:
providing a first mixture of cellulose fibers, sand and cement in dry form,
providing a second mixture of cellulose fibers, sand and cement in dry form, the density of cellulose fibers in the first mixture by weight being greater than the density of cellulose fibers in the second mixture by weight and the density of cement in the first mixture by weight being less than the density of cellulose fibers in the second mixture by weight,
mixing an excess of water in each of the first and second mixtures,
disposing a thin, strong and porous tensile member on a surface to provide for a dewatering of any excess water through the thin porous element,
disposing a layer of the first wet mixture on the tensile member in a particular configuration, and
disposing a layer of the second wet mixture on the layer of the first wet mixture in the particular configuration while the first wet mixture is still wet, thereby to produce during the curing of the first and second mixtures, an interlinking relationship of the cement with the fibers and an interlinking of the cement in the first layer with the cement in the second layer and an interlocking of the cement in the first mixture with the tensile member.

29. A method as set forth in claim 28, including the step of:
providing for a steady and unrestrained dewatering of any excess water from the layers of the first and second wet mixtures through the tensile member and the surface after the disposition of these layers on the porous tensile member.

30. A method as set forth in claim 29, including the step of:
attaching to the tensile member, after the dewatering of any excess water from the first and second wet mixtures and the curing of the first and second mixtures, a thin layer of a non-flammable material having properties of reflecting and localizing heat applied to the building material.

31. A method as set forth in claim 29, including the steps of:
adhering to the tensile member, after the dewatering and curing of any excess water from the first and second wet mixtures, a thin layer of a material having properties of enhancing the strength of the building material and the resistance of the building material to bending and breakage, and
adhering to the strength-enhancing layer, after the dewatering of any excess water from the first and second mixtures and the curing of the first and second mixtures, a thin layer of a material having properties of reflecting and localizing heat applied to the building material.

32. In combination in a building material,
a first cured mixture including fibers made from a light-weight material, a material having properties of being cured with age to produce molecules bound to the fibers and interlinked with one another and particles of a material having properties of tempering the cured material, and
a second cured mixture disposed in adhered relationship with the first cured mixture, the second cured mixture including a material having properties of being cured with age and particles of a material having properties of tempering the cured material,
the weight per unit volume of the cured material in the first mixture being less than the weight per unit volume of the cured material in the second mixture.

33. In a combination as set forth in claim 32,
a porous tensile member adhered in a thin layer to the first cured mixture at the face of the first cured mixture opposite the second cured mixture.

34. In a combination as set forth in claim 32,
the amount of the fibers by weight in the first cured mixture constituting to approximately twenty percent (20%) by weight and the weight per volume of the particles of the tempering material in the first cured mixture constituting to approximately twenty percent (20%) by weight and the weight per unit volume of the cement constituting at least fifty percent (50%) by weight and
the weight per unit volume of the cured material in the second cured mixture constituting between approximately thirty five percent (35%) and seventy five percent (75%) by weight, the second cured mixture being able to withstand bending.

35. In a combination as set forth in claim 32,
means adhered to the tensile member for localizing and reflecting the heat applied to the building material.

36. In a combination as set forth in claim 32 for application to a building,
means adhered to the tensile member for imparting strength to the first and second cured mixtures to prevent such cured mixtures from cracking as a result of forces applied to such cured mixtures to lift such cured mixtures from the building.

37. In a combination as set forth in claim 32,
the fibers constituting cellulose fibers and the cured material constituting cement.

38. In a combination as set forth in claim 32,
the second cured mixture being harder and thinner than the first cured mixture and being exposed to the atmosphere.

39. In a combination in a building material,
a first layer including a cured mixture of cellulose fibers, sand and cement, and
a second layer including a cured mixture of sand and cement;
the second layer being thinner than the first layer and being disposed on the first layer and being harder than the first layer.

40. In a combination as set forth in claim 39,
a porous tensile member mechanically interlocked with the first layer at the end of the first layer opposite the second layer.

41. In a combination as set forth in claim 39,
the second layer having more sand than the first layer.

42. In a combination as set forth in claim 39,
the first and second layers having properties of having nails driven through them without cracking and of being sawed without cracking and the second layer being exposed to the atmosphere.

43. In combination in a building material,
a first layer including a material having properties of being cured with age and particles of a material having properties of tempering the cured material,
a second layer including the material having properties of being cured with age and particles of the material having properties of tempering the material, the second layer being disposed on the first layer,
the amount of the tempering material in the second layer being greater than the amount of the tempering material in the first layer,
the second layer being under compression, and
means for imposing a tensile force on the first layer.

44. In a combination under set forth in claim 43,
there being fibers of a light-weight material included in the first layer, the cured material in the first layer being bound to the fibers.

45. In a combination as set forth in claim 43,
the second layer being thinner and harder than the first layer.

46. In a combination as set forth in claim 45,
there being fibers of a light-weight material included in the first layer, the cured material in the first layer being bound to the fibers,
the first and second cured layers having properties of receiving nails through them without cracking and of being sawed without cracking.

47. In a combination as set forth in claim 43,
the amount of the cured material in each of the first and second layers being at least fifty percent (50%).

48. In a combination as set forth in claim 45,
the amount of the cured material being greater per unit of volume in the second layer than in the first layer.

49. In combination in a building material,
a first layer of a mixture including a cured material and a material for tempering the cured material,
a second layer of a mixture including the cured material and the material for tempering the cured material,
the second layer being under compression and including a greater amount of the tempering material than the first layer and being harder and thinner than the first layer and being disposed on the first layer, and
means retained by the first layer for applying a tensile force to the first and second layers in opposition to the compression from the second layer.

50. In a combination as set forth in claim 49,
the first layer including in the mixture fibers made from a light-weight material bound to the first material to provide for the interlinking of molecules in the first material.

51. In a combination as set forth in claim 49,
the weight per unit volume of the cured material in the first mixture being less than the weight per unit volume of the cured material in the second mixture.

* * * * *